US012201579B2

(12) United States Patent
Triolo et al.

(10) Patent No.: US 12,201,579 B2
(45) Date of Patent: *Jan. 21, 2025

(54) MECHANICAL SELF-LEVELING WALKER

(71) Applicants: CASE WESTERN RESERVE UNIVERSITY, Cleveland, OH (US); The United States Government As Represented By The Department Of Veterans Affairs, Washington, DC (US)

(72) Inventors: Ronald J. Triolo, Cleveland Heights, OH (US); Marc Louis Vitantonio, Cleveland, OH (US); Robert Craig Allen, Cleveland, OH (US); Shawn William Dellinger, Cleveland, OH (US); Anna E. Krakora, Cleveland, OH (US)

(73) Assignees: The United States Government As Represented By The Department Of Veterans Affairs, Washington, DC (US); Case Western Reserve University, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,678

(22) Filed: Jun. 7, 2023

(65) Prior Publication Data

US 2023/0310252 A1 Oct. 5, 2023

Related U.S. Application Data

(63) Continuation of application No. 16/994,119, filed on Aug. 14, 2020, now Pat. No. 11,707,401.

(Continued)

(51) Int. Cl.
*A61H 3/00* (2006.01)

(52) U.S. Cl.
CPC ......... *A61H 3/00* (2013.01); *A61H 2003/001* (2013.01); *A61H 2201/0192* (2013.01)

(58) Field of Classification Search
None
See application file for complete search history.

(56) References Cited

U.S. PATENT DOCUMENTS

| | | | |
|---|---|---|---|
| 2,474,722 | A | 6/1949 | Blume |
| 2,908,472 | A | 10/1959 | McDonald |

(Continued)

FOREIGN PATENT DOCUMENTS

| | | | |
|---|---|---|---|
| KR | 20220007940 | A | 1/2022 |
| WO | 2018/207095 | A1 | 11/2018 |

OTHER PUBLICATIONS

Stabilus Walkers and Lifting Aids {Online Catalog): Commercial products, as specifically published at: http://www.stabilus.com/applications/rehabilitation-applications/walkers-lifting-aids.html.

*Primary Examiner* — David R Dunn
*Assistant Examiner* — Danielle Jackson
(74) *Attorney, Agent, or Firm* — Ballard Spahr LLP

(57) ABSTRACT

As an example, a walker includes a first leg pair, a second leg pair and a cross beam connecting the first and second leg pairs in a parallel, spaced apart relationship. Each leg pair includes a U-shaped tube defining a front leg and a rear leg. A front strut is telescopically movable within the front leg and extends outwardly therefrom. A rear strut is telescopically movable within the rear leg and extends outwardly therefrom. A mechanical linear actuator includes a rotating element adapted to rotate relative to at least one of the front leg or the rear leg. The rotating element includes an interface with a track on the respective strut relative to which the (Continued)

rotating element rotates, whereby rotational motion of the rotating element translates to corresponding linear motion of the strut.

20 Claims, 12 Drawing Sheets

Related U.S. Application Data

(60) Provisional application No. 62/923,974, filed on Oct. 21, 2019.

(56) References Cited

U.S. PATENT DOCUMENTS

| | | | |
|---|---|---|---|
| 3,157,188 | A | 11/1964 | Farnham |
| 3,455,313 | A | 7/1969 | King |
| 4,094,330 | A | 6/1978 | Jong |
| 4,245,659 | A | 1/1981 | Shofner |
| 4,384,713 | A | 5/1983 | Deutsch et al. |
| 4,777,973 | A | 10/1988 | Nakajima |
| 5,349,977 | A | 9/1994 | Wood |
| 5,649,558 | A | 7/1997 | Richard |
| 5,787,913 | A | 8/1998 | Li |
| 6,145,524 | A | 11/2000 | Li et al. |
| 6,453,921 | B1 | 9/2002 | Rost |
| 8,667,976 | B2 | 3/2014 | Huang |
| 8,820,338 | B1 | 9/2014 | Catricala et al. |
| 9,119,757 | B2 | 9/2015 | Triolo et al. |
| 9,351,898 | B2 | 5/2016 | Triolo et al. |
| 9,545,354 | B1 | 1/2017 | Klausmeyer et al. |
| 10,500,121 | B2 | 12/2019 | Triolo et al. |
| 11,135,121 | B2 | 10/2021 | Brodie |
| 2012/0298160 | A1 | 11/2012 | Hamilton |
| 2020/0246210 | A1* | 8/2020 | Brodie .................... A61H 3/00 |
| 2021/0236377 | A1 | 8/2021 | Zibley et al. |

* cited by examiner

MECHANICAL SELF-LEVELING WALKER

CROSS-REFERENCE TO RELATED APPLICATIONS

This application is a continuation of U.S. application Ser. No. 16/994,119, filed Aug. 14, 2020, which claims the benefit of priority from U.S. provisional patent application No. 62/923,974, filed Oct. 21, 2019, which is incorporated herein by reference in its entirety.

TECHNICAL FIELD

This disclosure relates to a mechanical self-leveling walker.

BACKGROUND

Walkers, comprising light-weight tubular frames which form pairs of opposed legs joined in parallel spaced relation are in widespread use to assist those in need of support to better maintain stability and balance while walking or standing. A user stands between the leg pairs and grips the tubular frame, placing weight on the legs while standing or pushing the walker while walking. Existing walker designs are suited for traversing level ground and have legs of substantially equal length. However, when climbing stairs, a curb or an incline such walkers cannot provide reliable support to the user. Accordingly, there is a need for a self-leveling walker.

SUMMARY

As an example, a walker includes a first leg pair, a second leg pair and a cross beam connecting the first and second leg pairs in a parallel, spaced apart relationship. Each leg pair includes a U-shaped tube defining a front leg and a rear leg. A front strut is telescopically movable within the front leg and extends outwardly therefrom. A rear strut is telescopically movable within the rear leg and extends outwardly therefrom. A mechanical linear actuator includes a rotating element adapted to rotate relative to at least one of the front leg or the rear leg. The rotating element includes an interface with a track on the respective strut relative to which the rotating element rotates, whereby rotational motion of the rotating element translates to corresponding linear motion of the strut.

In another example, a walker includes a first leg pair, a second leg pair and a cross beam connecting the first and second leg pairs in a parallel, spaced apart relationship. Each leg pair includes a U-shaped tube defining a front leg and a rear leg. A front strut is telescopically movable within the front leg and extends outwardly therefrom, the front strut including notches to provide a front rack gear. A rear strut is telescopically movable within the rear leg and extends outwardly therefrom, the rear strut including notches to provide a rear rack gear. A front circular gear rotates relative to the front leg and includes teeth that provide a pinion to interface with the front rack gear. A rear circular gear rotates relative to the rear leg and includes teeth that provide a pinion to interface with the rear rack gear. A connecting element operatively couples the front and rear circular gears together to facilitate telescopic movement of the front and rear struts in opposite axial directions relative to each other.

In another example, a walker includes a first leg pair, a second leg pair and a cross beam connecting the first and second leg pairs in a parallel, spaced apart relationship. Each leg pair includes a U-shaped tube defining a front leg and a rear leg. A front strut is telescopically movable within the front leg and extends outwardly therefrom, the front strut including a helical groove to provide a front raceway. A rear strut is telescopically movable within the rear leg and extending outwardly therefrom, the rear strut including a helical groove to provide a rear raceway. A front ball nut rotates relative to the front leg about an axis extending through the front leg and includes ball bearings that interface with the front raceway. A rear ball nut rotates relative to the rear leg about an axis extending through the rear leg and includes ball bearings that interface with the rear rack gear. A connecting element operatively couples the front and rear ball nuts to each other to facilitate telescopic movement of the front and rear struts in opposite axial directions relative to each other according to rotational movement of the front and real ball nuts.

In yet another example, a method for adjusting height of a walker includes rotating a rotating element relative to at least one of a front leg or a rear leg of the walker to interface with a track on a respective strut, the respective strut extending outwardly from the leg relative to which the rotating element is being rotated. The method also includes translating the rotation of the rotating element to corresponding linear motion of the respective strut to adjust a length of at least the leg from which the respective strut extends.

DETAILED DESCRIPTION

This disclosure relates to a mechanical self-leveling walker. The walker includes four legs, including first and second leg pairs. A cross beam connects the first and second leg pairs in a parallel, spaced apart relationship. For each leg pair, a U-shaped tube defines a front leg and a rear leg. Each leg includes a telescopic strut that extends from a leg to terminate in a respective end (e.g., a foot) configured to contact the ground. The height of each strut is adjustable, such as by adjusting a length of each strut that extends from a respective leg. The front and rear struts of each leg pair may be operatively coupled together such that moving the front strut in a given direction within the front leg results in corresponding movement of the rear strut in the opposite direction with respect to the rear leg.

In some examples, the walker may include a mechanical linear actuator that includes a rotating element adapted to rotate relative to at least one of the front leg or the rear leg, the rotating element including an interface with a track on the respective strut relative to which the rotating element rotates, whereby rotational motion of the rotating element translates to corresponding linear motion of the strut. Examples of mechanical linear actuators that could be used include, rack and pinion actuators, a leadscrew actuator, a screw jack actuator, a ball screw actuator and a roller screw actuator. Each of these actuators include a rotating element that, when rotated, translates such rotation to linear movement of one or more struts of the walker (or linear movement of the strut(s) is translated to rotational motion of the rotating element). Motion of struts or rotating elements may be disabled by a clutch, which is adapted to lock the height of the legs in a fixed condition until released by activating the clutch.

Figure 1:
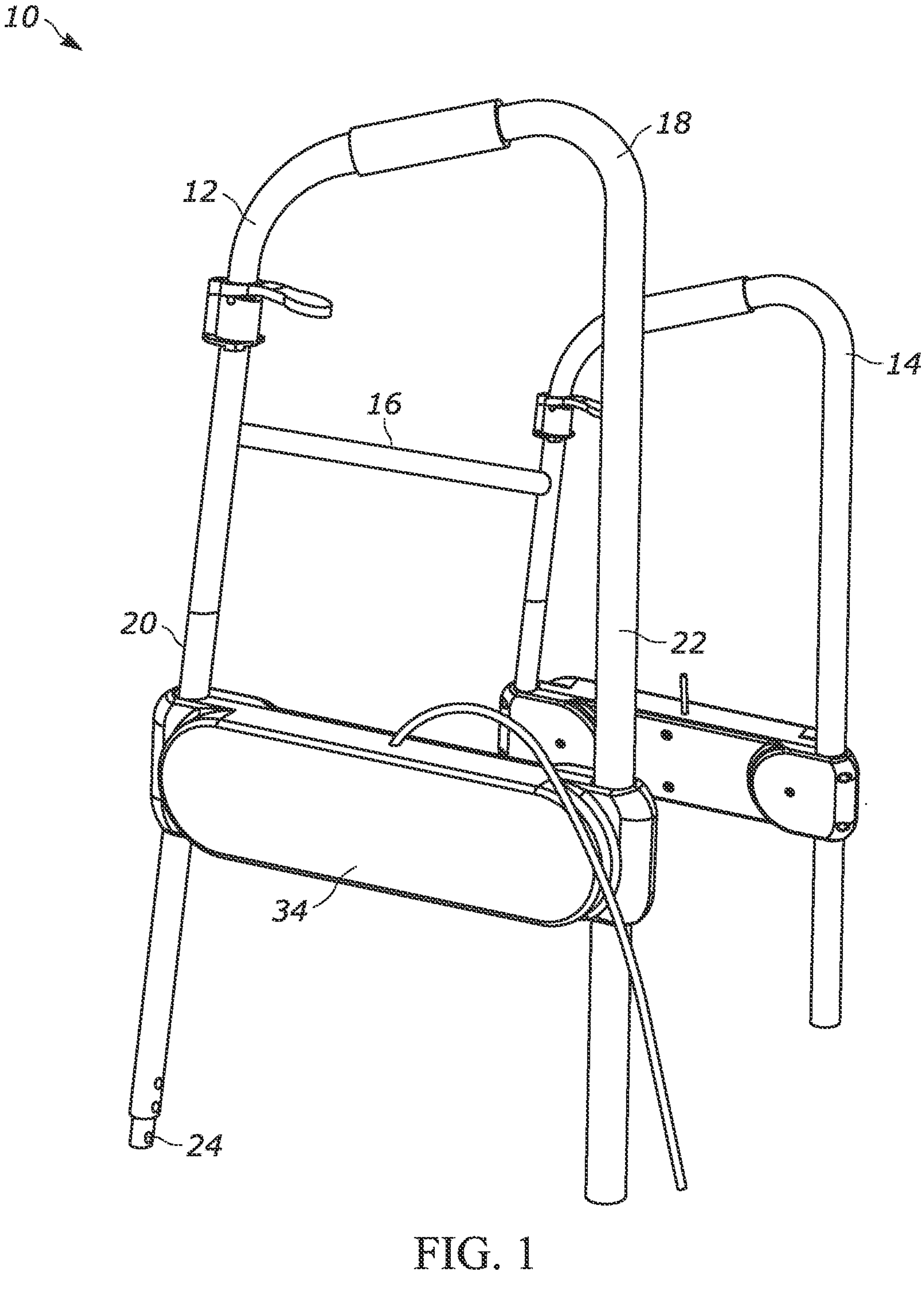
FIG. 1 depicts an example of a mechanical self-leveling walker.

FIG. 1 depicts an example of a mechanical self-leveling walker 10. The walker 10 includes a first leg pair 12 and a second leg pair 14. A cross beam 16 connects the first and second leg pairs 12 and 14 to maintain the leg pairs in a substantially parallel, spaced apart relation. In this example, the leg pair 12 includes a U-shaped tube 18 that defines a front leg 20 and a rear leg 22. A front strut 24 is telescopically movable within the front leg 20 and extends outwardly therefrom to terminate in an end. The leg pair 12 also includes a rear strut 26 that is also telescopically movable within the rear leg and extends outwardly therefrom. Each leg further may terminate in an end portion that may be equipped with a respective foot, glide or wheel (which may be interchangeable). The end portion further may be adapted to enable a fixed height adjustment that is set according to the height of the user.

Each leg pair 12 and 14 also includes a cross brace 34 extending between the front and rear legs 20 and 22. In the example of FIG. 1, the cross brace 34 is located at an intermediate position between a top and bottom portions of respective the front and rear legs 20 and 22.

Figure 2B:
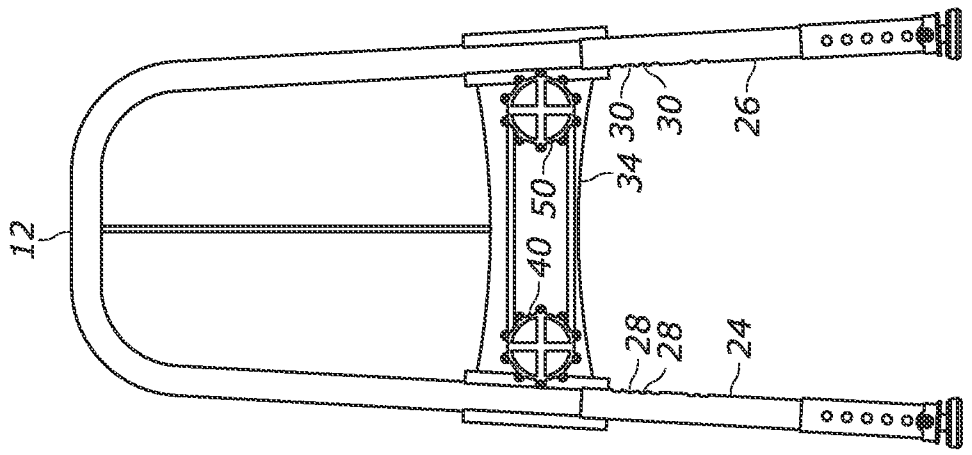
FIGS. 2A and 2B depict side views of the walker of FIG. 1.
Figure 2A:
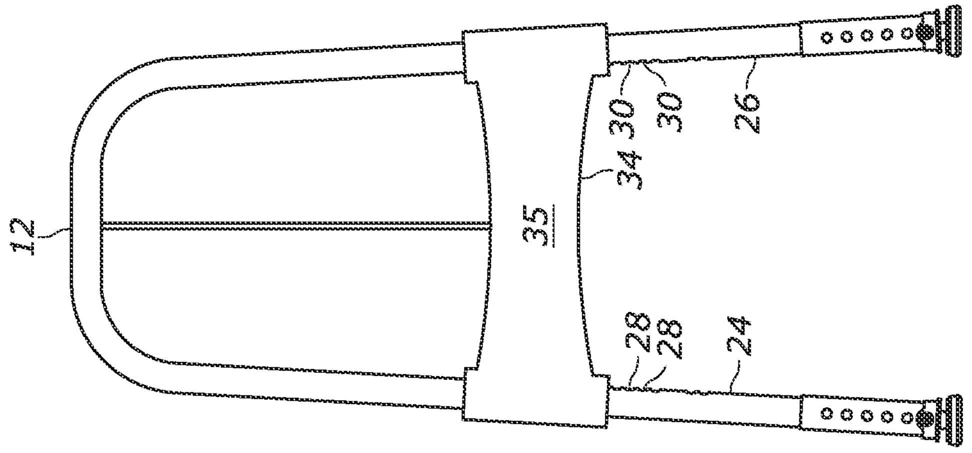
Figure 3:
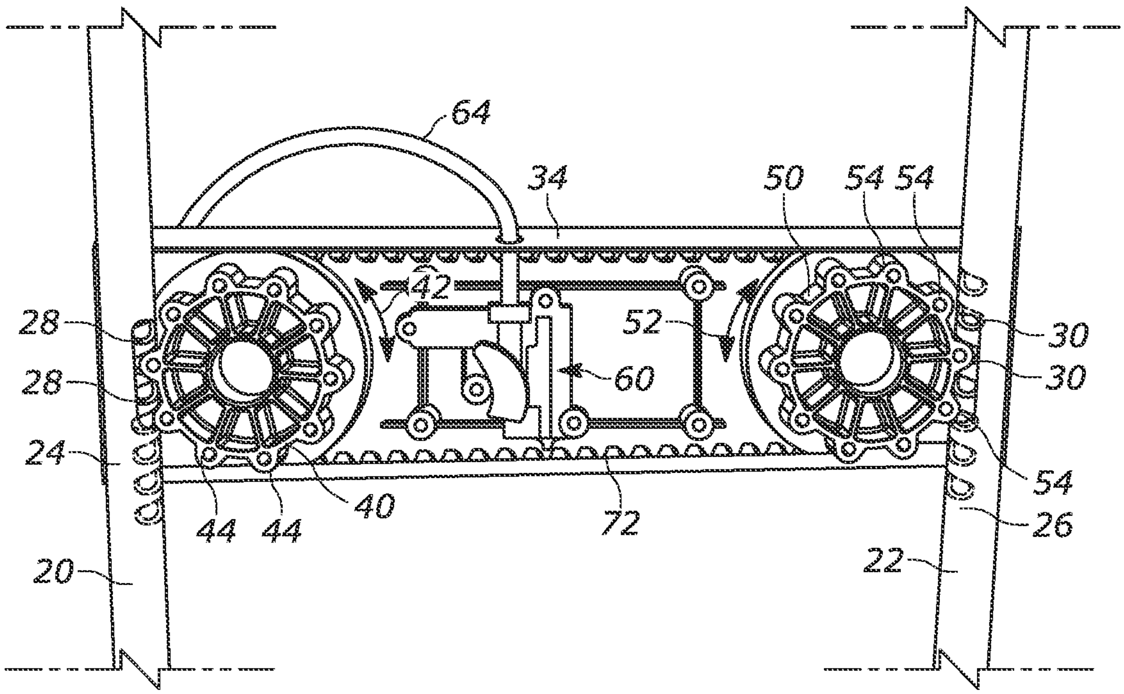
FIG. 3 depicts a side view of a cross-brace having a cover removed.
Figure 5:
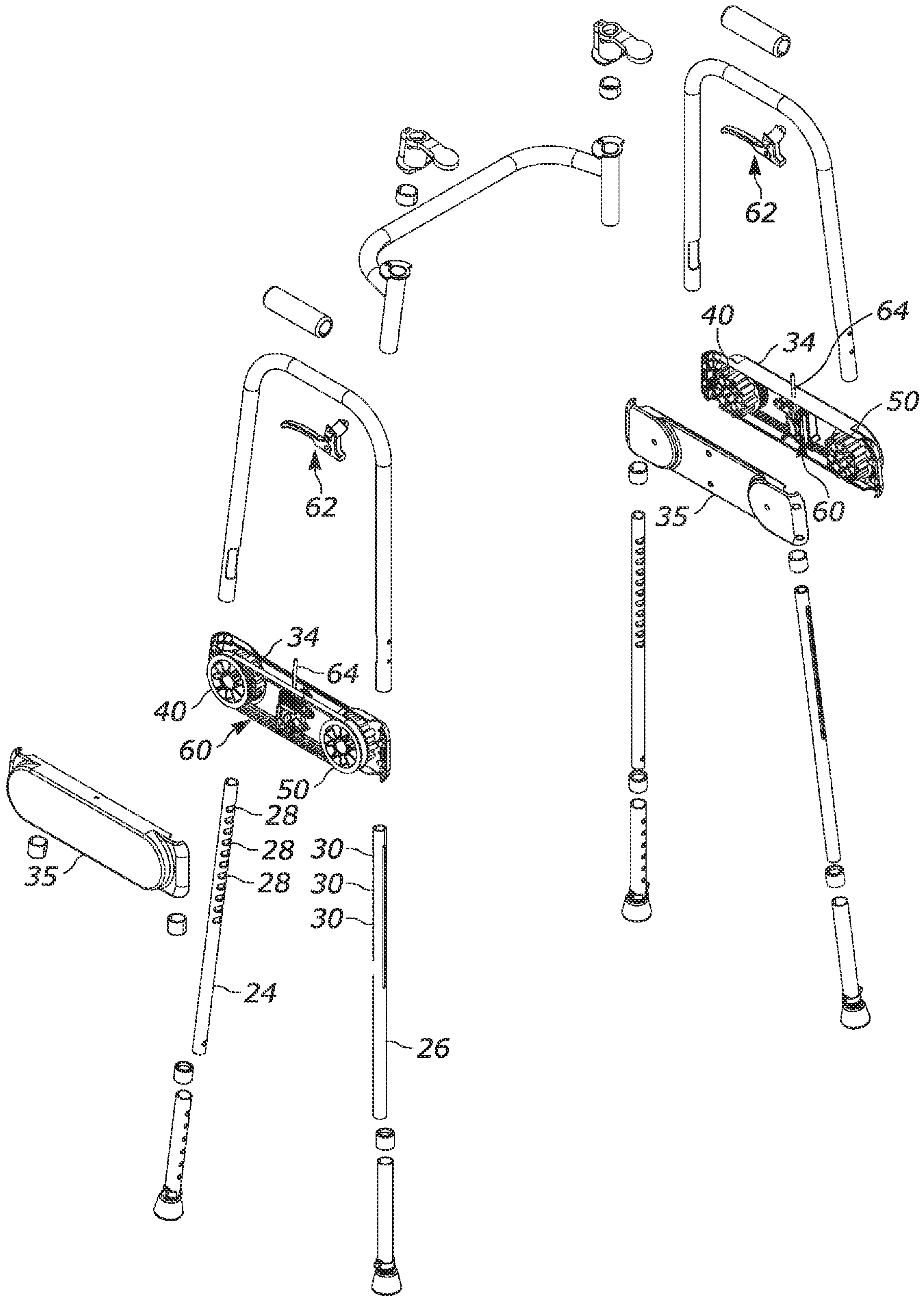
FIG. 5 is a partial assembly view of the mechanical self-leveling walker.

FIGS. 2A and 2B illustrate a side view of a respective leg pair 12. The other leg pair may have the same or similar configuration. In FIG. 2A a cross-brace 34 is shown to include a cover 35. In FIG. 2B, the cover is shown as being removed to illustrate some internal components of the cross-brace 34. FIG. 3 depicts a close-up view of the interior components within the cross brace 34. FIG. 5 depicts parts of the walker 10 in a disassembled arrangement, including the struts 24 and 26 and the cross brace 34.

As shown in FIGS. 3 and 5, each of the front and rear struts 24 and 26 includes respective notches 28 and 30 to provide a rack gear along a respective edge. As shown in FIGS. 2A, 2B and 3, the notches 28 and 30 are formed on inner edges of the respective struts 24 and 26 that face each other along the front and rear legs of the respective U-shaped tube of the leg pair 12, 14.

In the example of FIG. 3, the cross brace 34 includes a front circular gear 40 that is mounted for rotation (in the direction denoted by the arrow 42) within the cross brace about a central axis thereof. The front circular gear 40 includes teeth 44 that provide a pinion to interface with the front rack gear notches 28. As shown in FIG. 3, the teeth 44 are mating with respective notches 28 through an opening formed through the sidewall of the front leg 20 that exposes the notches to the teeth 44.

The cross brace 34 also includes a rear circular gear 50 that rotates relative to the cross brace in a direction indicated by arrows 52 about a central axis extending through the gear 50. The rear circular gear 50 includes teeth 54 that provide a pinion to interface with the rear rack gear notches 30 along the rear strut 26. For example, the rear leg 22 also includes an opening formed through the sidewall of the rear leg to expose the notches 30 along the inner edge of the rear strut to enable meshing between the rear gear teeth 54 and rack gear notches 30.

In an example, the front and rear gears 40 and 50 are operatively coupled together such that rotating one gear results in corresponding rotational movement of the other gear. As disclosed herein, such coupling between the gears translates to corresponding linear movement of the struts. In the example of FIG. 3, the front and rear gears 40 and 50 are coupled together by a connecting element (e.g., a belt or roller chain wire or other drive mechanism), demonstrated at 72. For example, with the rack and pinion configuration between the teeth 44 and notches 28 for the front leg 20 and as well as the between teeth 54 and notches 30 for the rear leg 22, the connecting element 72 is adapted to transfer movement of one strut 24 in a given direction within the respective leg 20 into corresponding movement of the other strut 26 in the opposite direction with respect to the other leg 22. For example, if the front strut moves into the front leg 20 (e.g., shortening the front leg), such linear movement of the front strut is translated from the notches to the teeth 44 to rotate the front gear 40. Rotation of the front gear 40 drives corresponding rotation of the rear gear 50 via the connecting element 72. Such rotation of the rear gear 50 is further translated to linear movement of the rear strut 26 to extend out of the (e.g., lengthening) the rear leg 22. The same motion system may work in the opposite manner. Additionally or alternatively, the struts 24 and 26 of each leg pair may be operatively coupled together through the U-shaped tube to enable motion to be transferred between the struts directly. For example, another connecting element, such as a cable, may be connected between proximal ends of the struts through a hollow passage of the U-shaped tube (see, e.g., FIG. 8A, 8B or 8C).

The walker 10 may also include a clutch (e.g., a locking mechanism) 60 that is adapted to disable and enable motion of the front and rear struts relative to the respective front and rear legs 20 and 22. In an example, the clutch 60 is configured to disable (e.g., lock) the gears 40 and 50 from rotating, which operates to block the transfer of motion between the struts 24 and 26, as described herein. In another example, the clutch 60 may be configured to lock one or both of the struts 24 and 26 at a given length position with respect to the legs 20 and 22.

Figure 4:
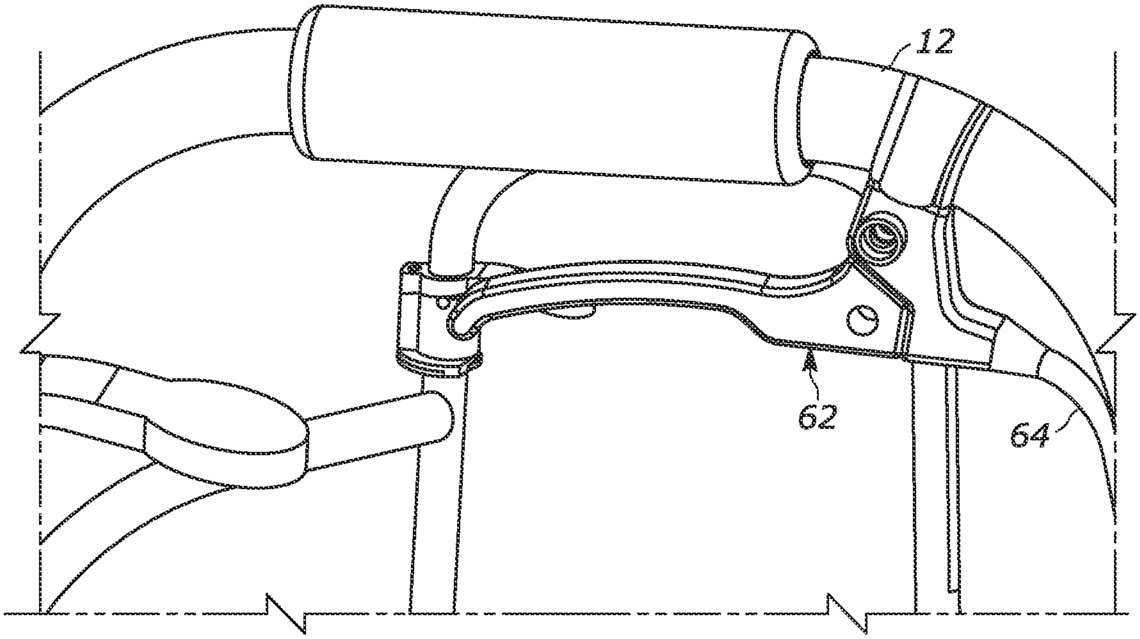
FIG. 4 depicts an example of a lever that can be used to activate a clutch.

As an example, a lever 62, which is connected to the clutch 60 through a cable (or other connecting element) 64, may be actuated in response to a user moving the lever toward the tubular top portion of the U-shaped tube. Actuation of the lever 62 activates the clutch 60 to enable the motion of the struts 24 and 26. FIG. 4 depicts an example of a lever 62 that may be utilized to activate and deactivate the clutch 60 in response to a user pulling the lever towards the upper part of the walker U-shaped tube. In an example, in response to activating the lever 62, the clutch 60 selectively releases the belt 72 within the housing of the cross brace 34, such that the gears 40 and 50 may rotate and such rotational movement is transferred between the respective gears 40 and 50 through the belt 72. Then, when the lever 62 is deactivated (or moved to its original position), the clutch 60 engages the belt 72 to lock it in place and prevent rotational movement of the gears 40 and 50.

Figure 6A:
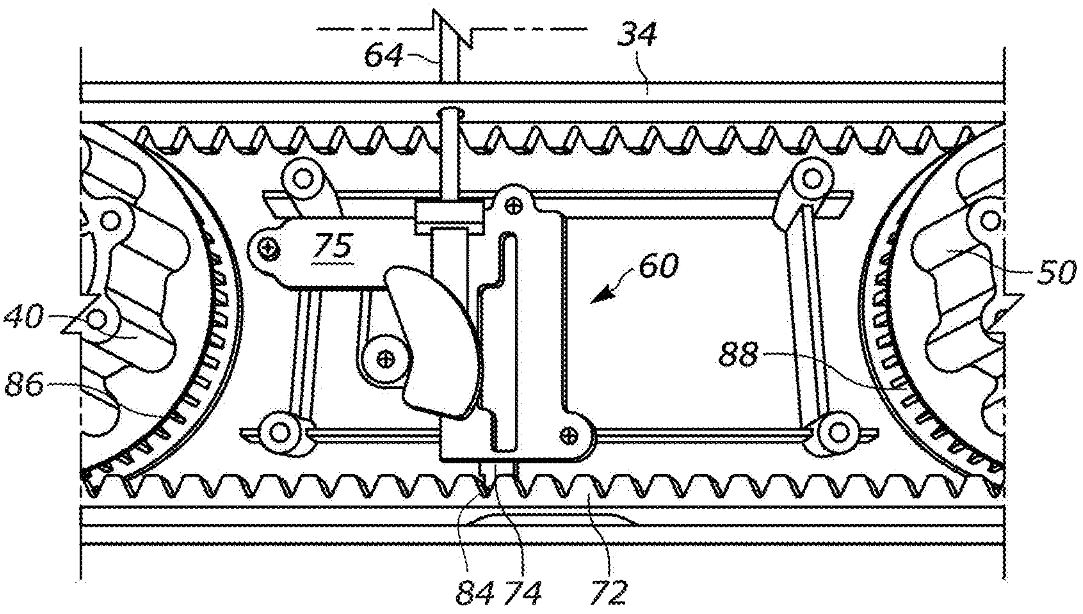
FIGS. 6A and 6B depict an interior of the cross-brace showing an example clutch apparatus in activated and deactivated conditions.
Figure 6B:
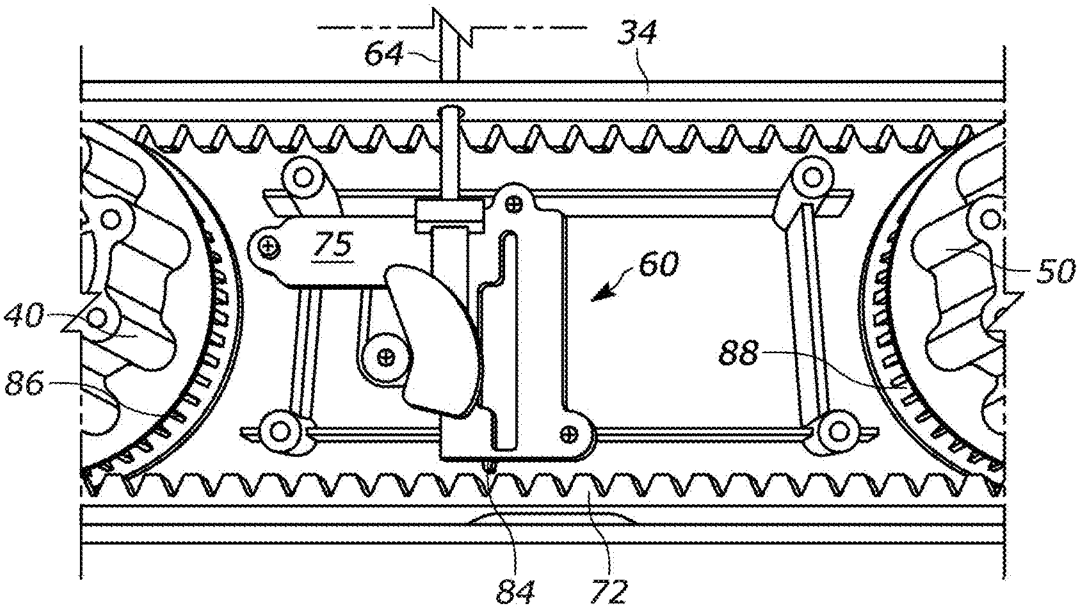

FIGS. 6A and 6B illustrate an example of the belt 72 and the clutch (locking mechanism) 60 in the locked and unlocked position, respectively. The clutch 60 is coupled to a lever (e.g., lever 62) through the cable 64. The clutch 60 includes a locking pin 74 that is moveable into and out of engagement with the respective belt 72 such as in response to activation of the lever 62. For example, the locking pin moves orthogonal to a direction of movement of the belt 72 within the cross brace 34.

Figure 7A:
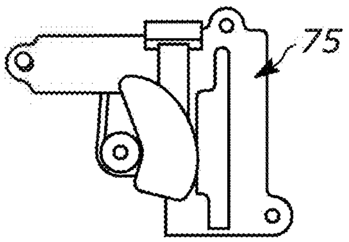
FIGS. 7A, 7B and 7C depict parts the clutch of FIGS. 6A and 6B with a cover of the clutch apparatus removed to show further features thereof.
Figure 7B:
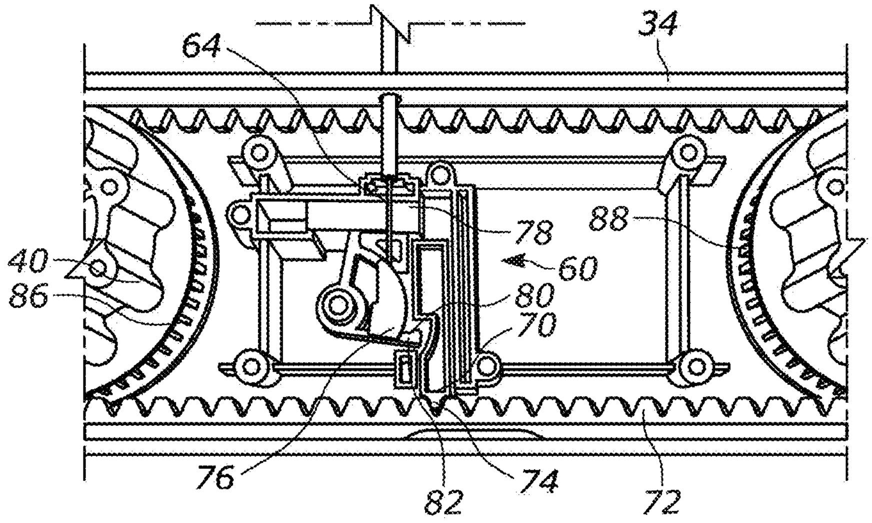
Figure 7C:
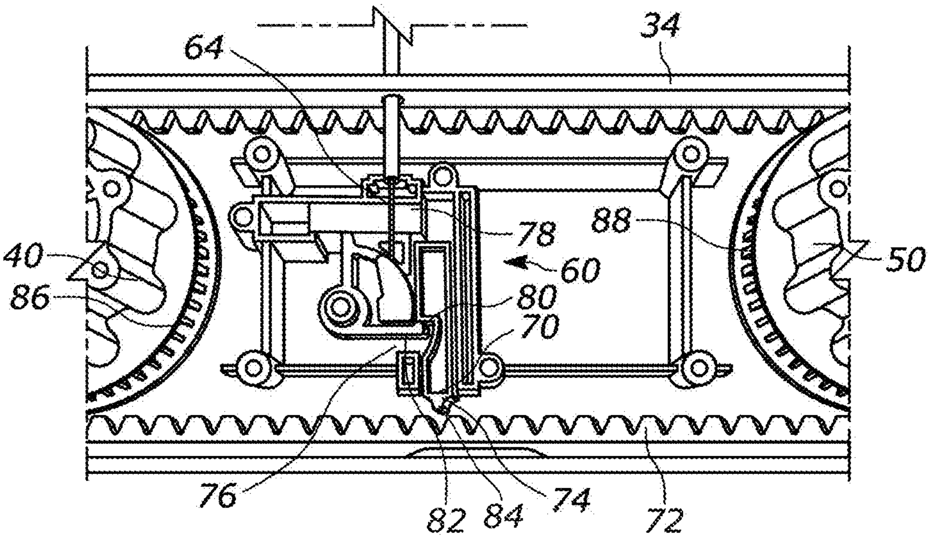

FIG. 7A depicts the cover 75 that is applied over the clutch 60, as shown in FIGS. 6A and 6B. FIGS. 7B and 7C illustrate the clutch 60 with the cover 75 removed, showing additional features of the clutch. For example, the clutch 60 includes a cam 76. An end of the cable 64, which is connected to the lever, is also connected to the cam 76. The cam 76 is adapted to rotate about an axis to slide a lockout bar 78 in a direction that is orthogonal to the direction of movement of the locking pin 74. The lockout bar 78 is configured to prevent unintended disengagement of the locking pin 74 by blocking movement of the locking pin until the clutch is activated. The actuation of the cam 76 (in response to actuation of the lever 62 through cable 64) thus causes the lockout bar 78 to slide out of the way to create a space into which the locking pin 74 may move and disengage the belt 72. The cam 76 also includes an arm 80 that is adapted to engage a shelf 82 of the locking pin when rotated. Thus, by the cam 76 rotating, the arm engages the shelf 82 of the locking pin 74 to move the locking pin away from and out of engagement with the belt 72.

In an example, the belt 72 is a toothed belt having teeth formed along its inner surface and the locking pin 74 includes an end portion (e.g., a tip) 84 that is dimensioned and configured to fit between the teeth. The teeth mesh corresponding teeth of respective sprockets 86 and 88 over which the belt 72 runs. Each of the sprockets 86 and 88 are coaxial and are attached to rotate commensurate with rotation of the respective pinion gears 40 and 50. In an example, the sprocket 86 and gear 40 form an integral rotating structure and the sprocket 88 and gear 50 form another integral rotating structure, and each integral rotating structure may be formed together as a monolithic structure.

In the locked position, the tip 84 of the locking pin 74 engages the belt 72, between teeth, and urges the belt against an inner wall of the cross brace 34. This prevents movement of the belt 72, which locks the gears 40 and 50 as well as the struts at their current positions. In response to activation of the lever 62, the clutch 60 (through rotation of the cam 76) lifts the locking pin 74 away from the belt 72 to enable rotation of the belt and gears 40 and 50, such that the struts 24 and 26 may likewise move telescopically in opposite directions. In this example, the movement is transferred between the struts 24 and 26 through the belt 72 and gears 40 and 50.

Figure 8C:
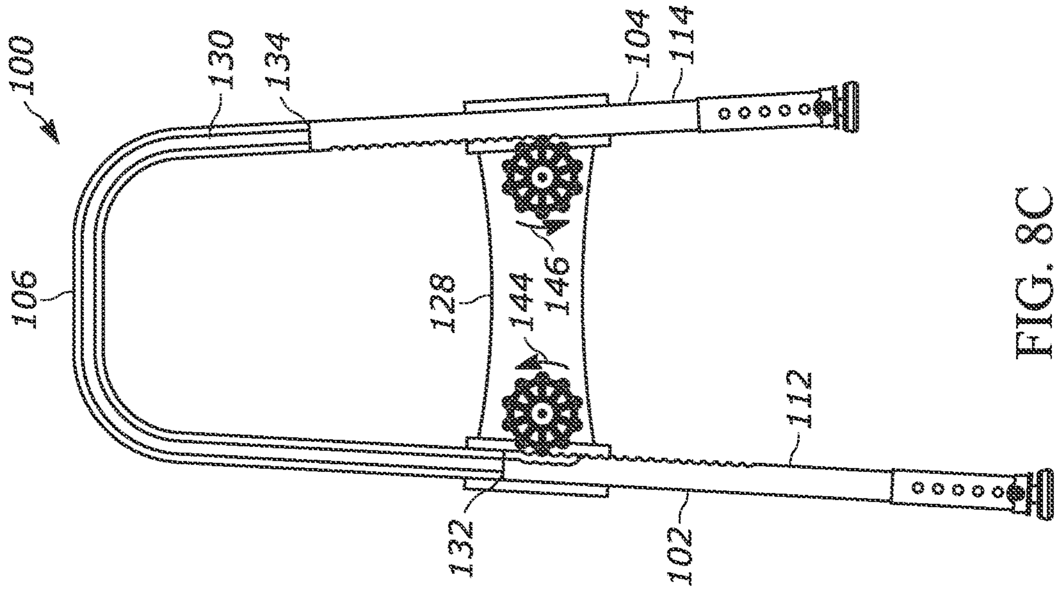
FIGS. 8A, 8B, and 8C is a side view of a mechanical self-leveling walker depicting front and rear legs positioned at different lengths.
Figure 8B:
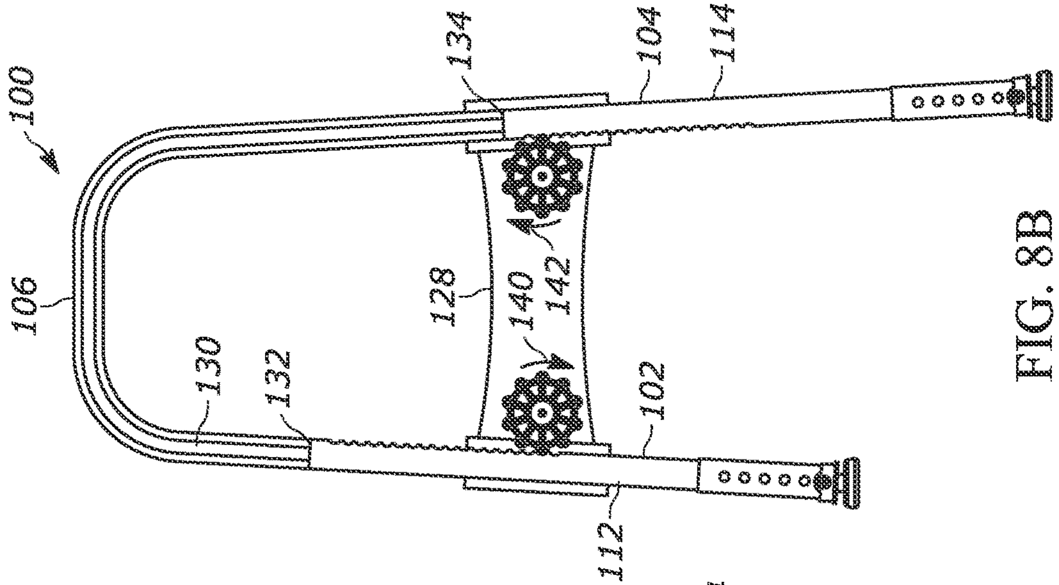
Figure 8A:
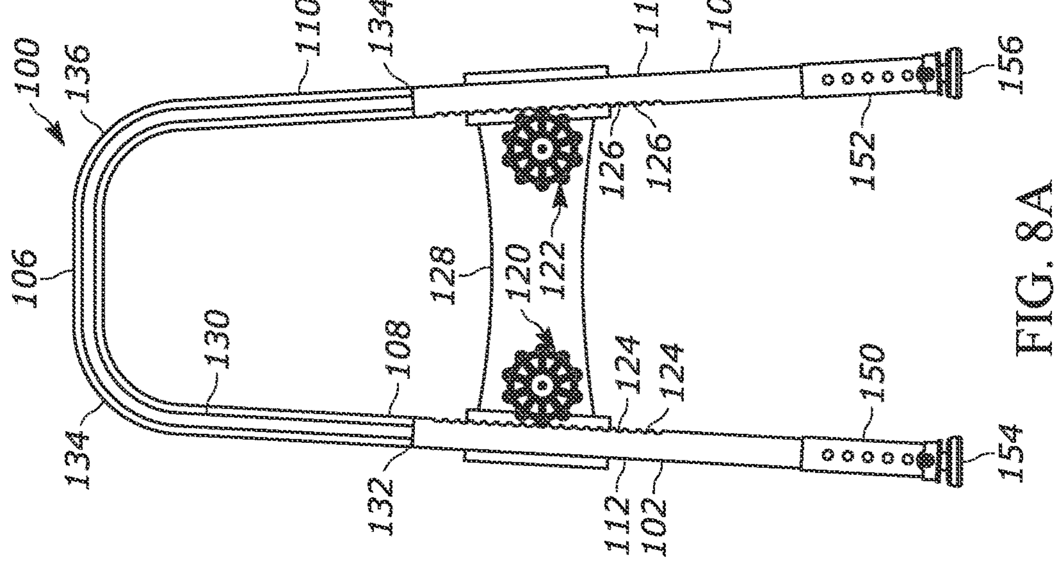

FIGS. 8A, 8B and 8C depict a side view of a walker 100 showing front and rear legs 102 and 104 connected by a U-shaped cross support 106. In the example of FIGS. 8A, 8B and 8C, a locking mechanism and actuator are removed for ease of explanation. Examples of actuators and locking mechanisms are demonstrated in FIGS. 9 and 10. It is appreciated, however that different locking mechanisms and actuators could be used in other examples, including those described herein with respect to FIGS. 6A, 6B, 7A and 7B.

As shown in the examples of FIGS. 8A, 8B and 8C, ends of the U-shaped cross support 106 form corresponding legs 108 and 110 into which corresponding struts 112 and 114 are telescopically attached. The walker 100 also includes a front gear 120 and a rear gear 122, each mounted for rotation about a respective central axis thereof. For example, each gear 120 and 122 is mounted to a cross brace 128 that extends between the front and rear legs 108 and 110, respectively. The front gear 120 include teeth to provide a pinion to interface with front rack gear notches 124. For example, the teeth of the front pinion gear 120 mate with the respective rack gear notches 124 through an opening formed through a sidewall of the front leg 108 that exposes the notches to the teeth. Similarly, the rear gear 122 includes teeth that mate with corresponding notches 126 formed in the rear strut 114 through a corresponding opening in the wall of the rear leg 110. In this example, each of the gears is to rotate responsive to movement of the respective struts 112 and 114 relative to the respective front and rear legs 108 and 110 of the walker.

In the example of FIGS. 8A, 8B and 8C, an internal connecting element 130 resides within a hollow passage of the U-shaped support 106. One end of the connecting element 130 is connected to an upper end 132 of the front strut 112. Another end of the connecting element 130 is attached to an upper end 134 of the rear strut 114. The connecting element 130 may be flexible, such as may be a cord, cable, a chain or other structure, which can flex in radial directions such as it moves within the U-shaped support 106 but have sufficient rigidity in the axial direction to maintain a fixed length between the struts 112 and 114, including during movement of the struts. The rigidity and type of connecting element 130 may dictate the bend radius of the U-shaped support 106 at respective corners 134 and 136.

Movement of one strut 112 is transferred through the connecting element 130 to the other strut 114 and is further facilitated by the rotation of the gears 120 and 122. As shown in FIG. 8B, in response to the front strut 112 moving into the front leg 108, the connecting element between the struts causes the rear strut to move out of (lengthen) by a corresponding amount, which also results in the front gear 120 rotating in a clockwise direction, indicated by arrow 140, and the rear gear 122 also rotating in the clockwise direction, indicated by arrow 142. Similarly, as shown in FIG. 8C, rotation of the front gear 120 in the direction of the arrow 144 results in corresponding rotation of the rear gear 122 in the direction of the arrow 146. This rotation is in response to linear motion of the strut 112 relative to the leg 108 which is transferred to the opposite strut 114 through the connecting element 130. While not shown in FIGS. 8A, 8B and 8C, one or more clutches (locking mechanisms) may be implemented to control (e.g., lock) movement of the struts, as disclosed herein.

While the arrangement of gears 120 and 122 and struts 112 and 114 enable dynamic adjustments of the legs during operation, each of the legs 102 and 104 may also be configured with a height adjustment, such as in the form of button locks, which include a biased set of tabs that can extend through corresponding holes in the adjustable lower leg portions 150 and 152 that extend outwardly from the respective struts 112 and 114. Thus, the lower leg portions 150 and 152 provide an additional height adjustment, such as for setting a height of the walker 100 according to the height of the user. For example, a user can adjust the height of the walker a single time using the push-pin clips and, once set can remain fixed during use. Each of the legs 102 and 104 of the walker also may equipped with respective feet, such as may be self-leveling feet 154 and 156. Alternatively, the legs may be equipped with glides or wheels (which may be interchangeable with the feet).

Figure 9:
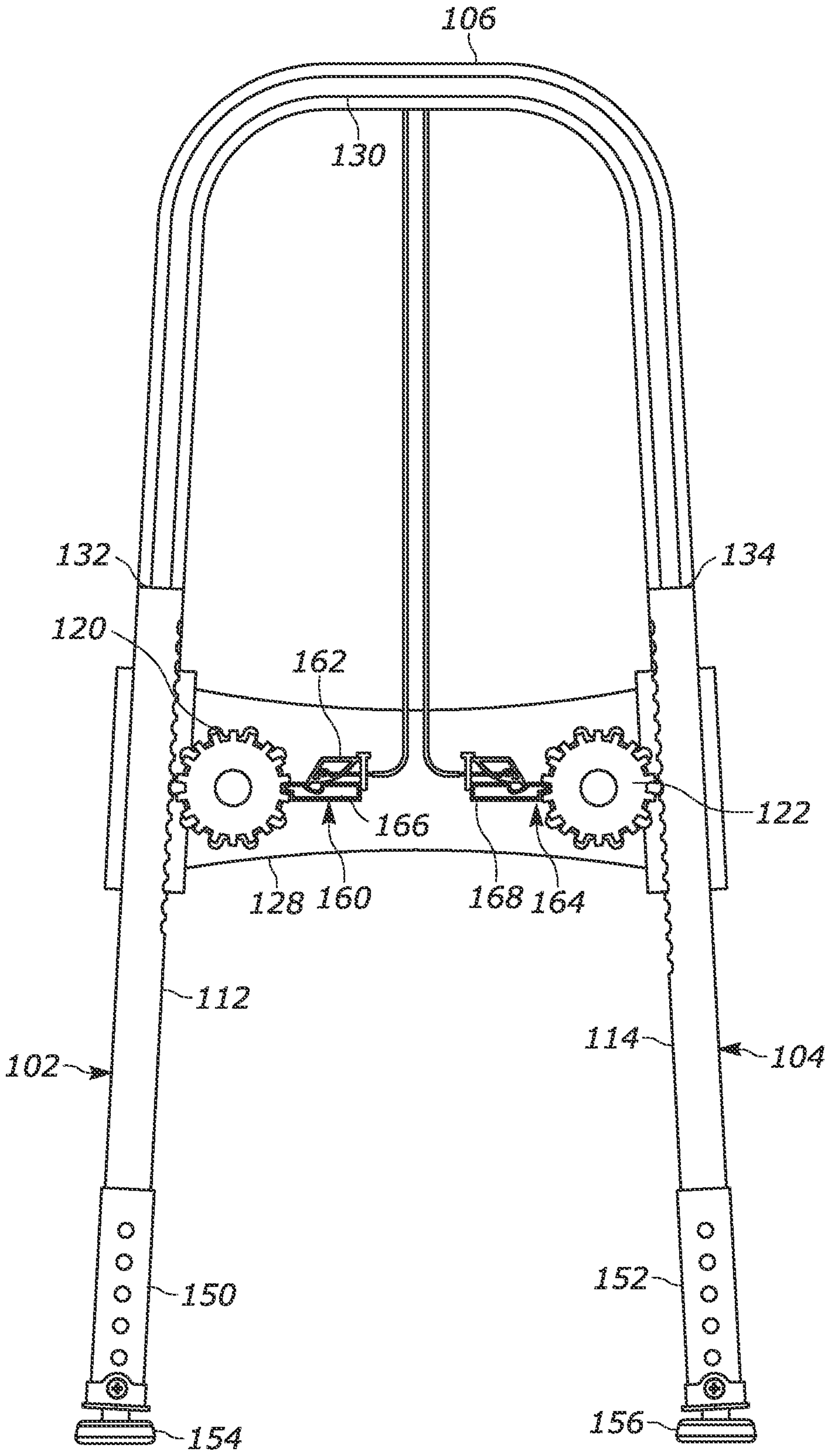
FIG. 9 is a side view of a mechanical self-leveling walker depicting an example of another clutch mechanism.

FIG. 9 depicts an example of the walker 100 includes a locking mechanism 160 to selectively enable and disable (e.g., lock) movement of the struts 112 and 114. A control apparatus (not shown, but see, e.g., lever of FIG. 4) is adapted to selectively operate the locking mechanism 160 in one of the first or second conditions. In the example of FIG. 9, the locking mechanism 160 includes a pair of clutches 162 and 164. The clutch 162 is configured to enable or disable rotation of the front gear 120. The other clutch 164 is configured to enable or disable the rotation of the rear gear 122. While two clutches 162 and 164 are shown in the example of FIG. 9, it is understood that, in other examples, the walker 100 could operate with a single clutch designed to enable or disable rotation of one of the gears 120 or 122. Each of the respective clutches 162 and 164 includes a respective locking pin 166 and 168 that is biased (e.g., by a spring) to engage the gear and inhibit rotation of the respective gear. In response to activating a lever (not shown), the locking pin 166 may be withdrawn away from the respective gear and out from between the teeth to enable rotation of the gear, such as responsive to linear strut movement into or out of the respective leg.

Figure 10:
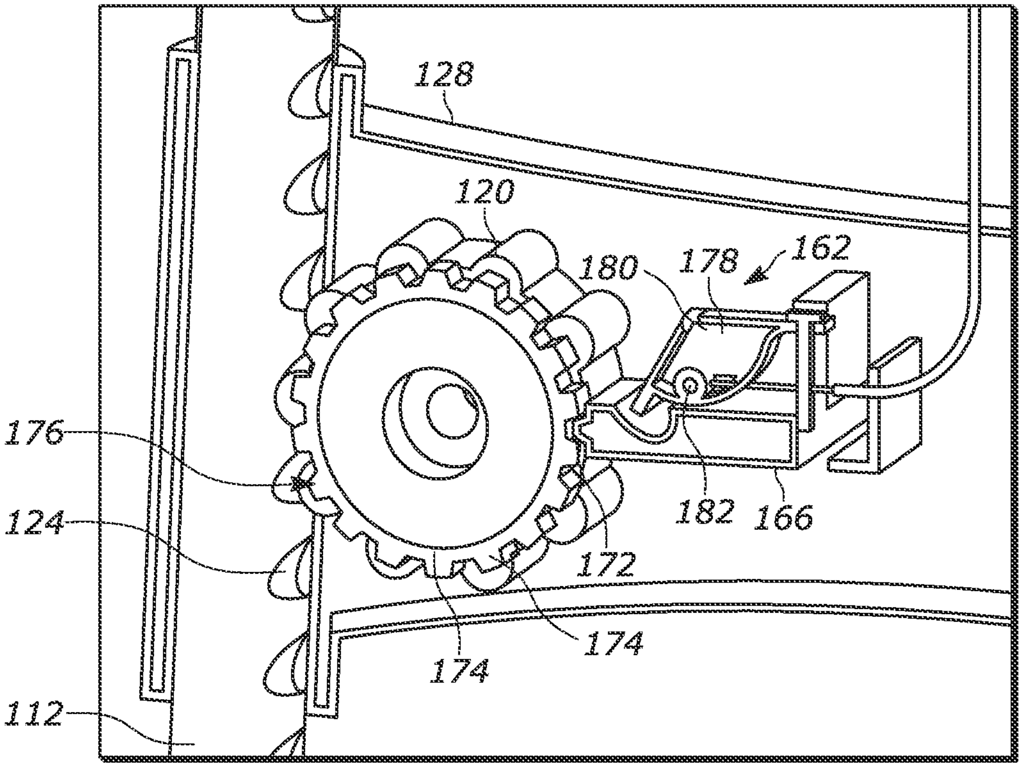
FIG. 10 is a closeup view of the locking mechanism of FIG. 9.

FIG. 10 illustrates a close-up view of the clutch 162 of FIG. 9. As an example, the locking pin 166 having a distal end 172 configured to fit within a space between respective teeth 174 of a sprocket 176 that is mounted coaxially and fixed to the pinion gear 120. In an example, the sprocket 176 may be integrally formed with the pinion gear 120 to provide a monolithic structure. A cam 178 rotates about an axis 180 so that a protruding end engages to slide out the locking pin 166 away from the sprocket 176. For example, an end 182 of the cable, which is attached to a lever, can be attached to the cam 178, such that activation of the lever to which the cable is secured results in the corresponding rotation of the cam 178 to release the locking pin 166 from the sprocket 176. The locking pin 166 and/or the cam 178 may be biased (e.g., by a spring or other elastic biasing element) to urge the locking pin into engagement with the sprocket 176 (e.g., a default position). When the lever is actuated the locking pin thus releases the sprocket to enable rotation of the gear 120 responsive to an axial force applied to one or both of the legs. When the lever is released, the locking pin 166 reengages the sprocket 176 to lock gear 120 and the struts at their current location. While the example of FIG. 10 illustrates the front gear 120 and front clutch 160, it is illustrated that the rear clutch 168 and gear 122 may be implemented by the same construction.

Figure 11:
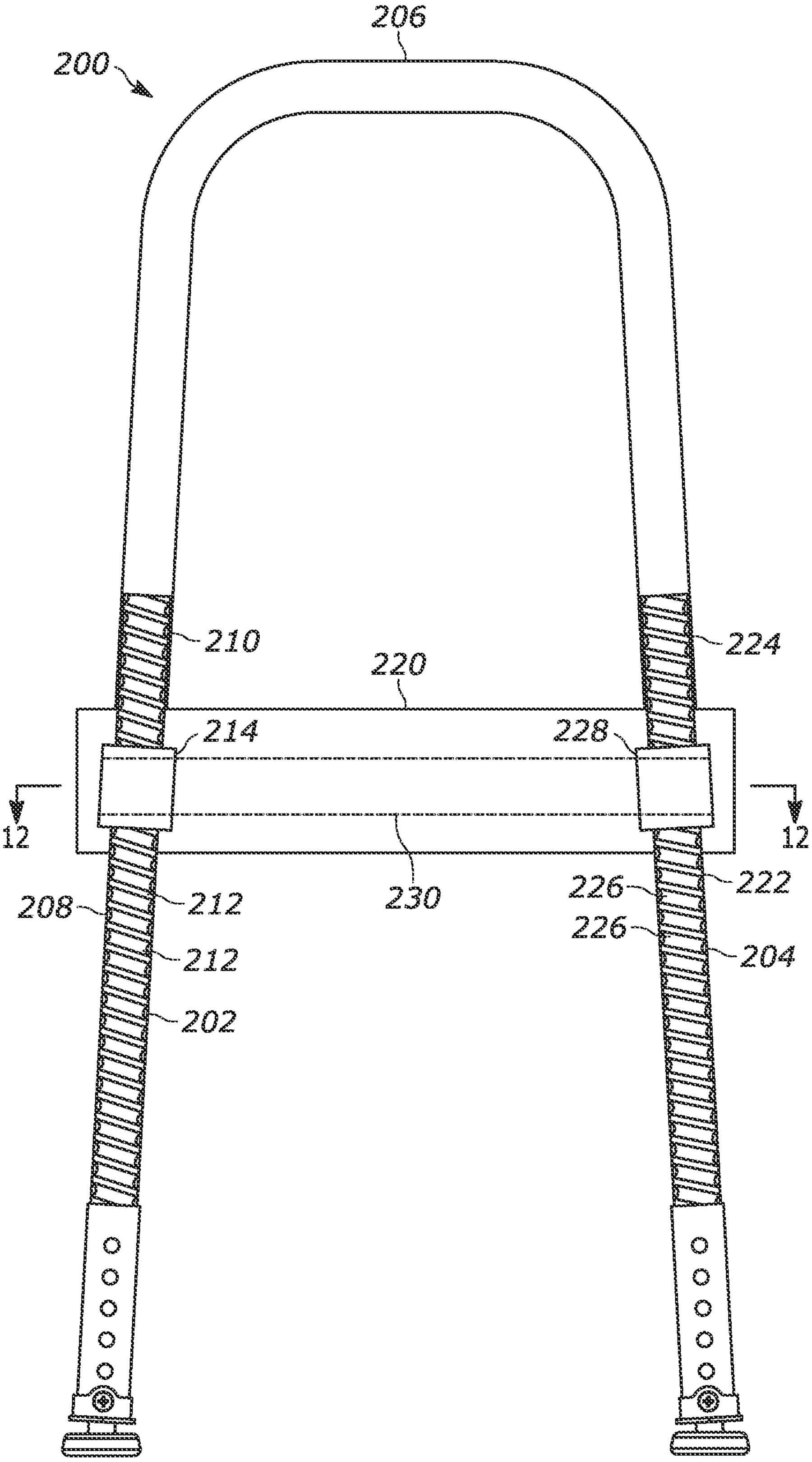
FIG. 11 is a side view of a walker illustrating another example of a mechanism for adjusting a length of the legs.

FIG. 11 is a side view illustrating another example of a walker 200. The walker 200 thus would include first and second leg pairs that are spaced apart by a cross beam, such as shown and described herein. In the side view of FIG. 11, for ease of illustration, one of the leg pairs of the walker is shown and includes a front leg 202 and a rear leg 204, which are joined together by a U-shaped tube 206. The walker 200 also includes a front strut 208 that is telescopically movable within a front leg portion 210 of the U-shaped tube 206 and extends outwardly from the leg. Thus, a portion of the strut 208 may extend into a hollow passage of the front leg portion 210. The front strut 208 also includes threaded exterior surface, such as a helical groove formed along the exterior surface of the strut, to provide a front raceway 212 of a ballscrew. A front ball nut 214 of the ballscrew is mounted with respect to the front leg portion 210 and around the threaded surface of the strut 208. For example, the ball nut 214 is mounted within a cross brace 220 that extends between the front and rear legs 202 and 204. The front ball nut 214 is configured to rotate within the cross brace 220 relative to the front leg about an axis extending through the front leg while maintaining a fixed axial position with respect to the cross brace. The front ball nut includes ball bearings that interface with the front raceway 212. Thus, rotation of the ball nut 214 about its axis results in corresponding axial movement of the front strut relative to the ball nut to provide corresponding telescoping movement of the front leg 202. The ball nut 214 can be mounted in a bushing or other housing with respect to a cross brace 220 to enable rotation of the ball nut 214 at a fixed axial position.

The walker 200 also includes a rear strut 222 that is telescopically movable within a rear leg portion 224 of the U-shaped tube 206 to extend outwardly therefrom. A portion of the strut 222 also extends into a hollow passage of the rear leg portion 224. The rear strut 222 also includes a helical groove to provide a front rear raceway 226 along the exterior surface of the strut. A rear ball nut 228 is mounted with respect to the rear leg portion 224. For example, the ball nut 228 can be mounted in a bushing or other housing with respect to the cross brace 220 to enable rotation of the ball nut 228 at a fixed axial position. The rear ball nut 228 is configured to rotate relative to the rear leg about an axis extending through the leg while being held at a fixed axial position (e.g., with respect to the cross brace 220). The rear ball nut 228 includes ball bearings that interface with the front raceway 212, such that rotation of the ball nut about its axis results in corresponding telescoping movement of the rear strut 222. Additionally, the raceways 212 and 226 and ball nuts 214 and 228 can be configured with same thread pitch and having right- or left-hand thread so that rotation of the respective ball nuts causes equal and opposite telescopic movement of the struts 208 and 222.

As used herein, a ballscrew is a mechanical linear actuator that translates rotational motion to linear motion with little friction. The ball assembly acts as the nut while the threaded shaft is the screw. While a ballscrew is demonstrated in the example of FIG. 11, other types of mechanical linear actuators could be used in other examples, such as described herein.

A belt or other coupling may be attached around or otherwise coupled to the respective ball nuts so that rotation of one ball nut is transferred to provide corresponding rotation of the other ball nut, such that telescoping movement of the front and rear legs is provided in opposite directions and equal distance. The belt may be attached to a motor, lever or other actuating mechanism to provide corresponding movement of the belt in a desired direction. The direction of rotation of the ball nuts 214 and 228 may be changed depending upon whether to lengthen or shorten each of the respective legs.

Figure 12:
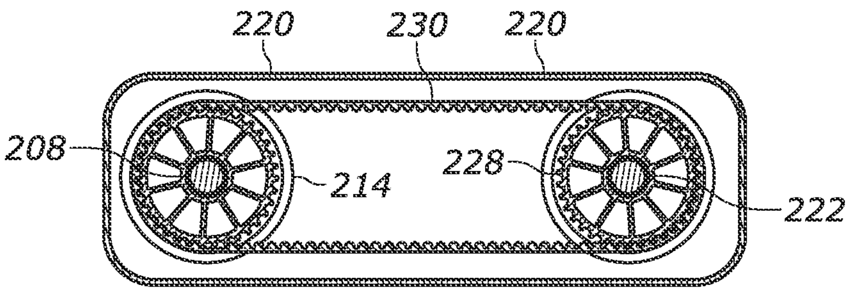
FIG. 12 is a cross sectional view taken along the line 12-12 in the walker of FIG. 11

FIG. 12 is a cross sectional view taken along the line of 12-12 in the walker 200 of FIG. 11. As shown in FIG. 12, the belt 230 circumscribes the ball nuts 214 and 228. In an example, the belt 230 is a toothed belt that be run over matched toothed sprockets that are fixed coaxially to the respective ball nuts 214 and 228. Actuation of the belt 230 to provide corresponding rotation of the ball nuts 214 and 218 may be affected by remote control (e.g., via a lever or other actuator). For example a rotary motor may be operatively coupled to the belt or to another gear that is attached to one or both ball nuts 214 and 228 to transfer rotational motion to the ball nut that is coupled to the opposite ball nut. In this way rotation of the belt in one direction causes the front leg to lengthen and the rear leg to shorten by a corresponding amount. Rotation of the belt in the opposite direction results in a lengthening of the rear leg and shortening of the front leg, as described herein.

Figure 13:
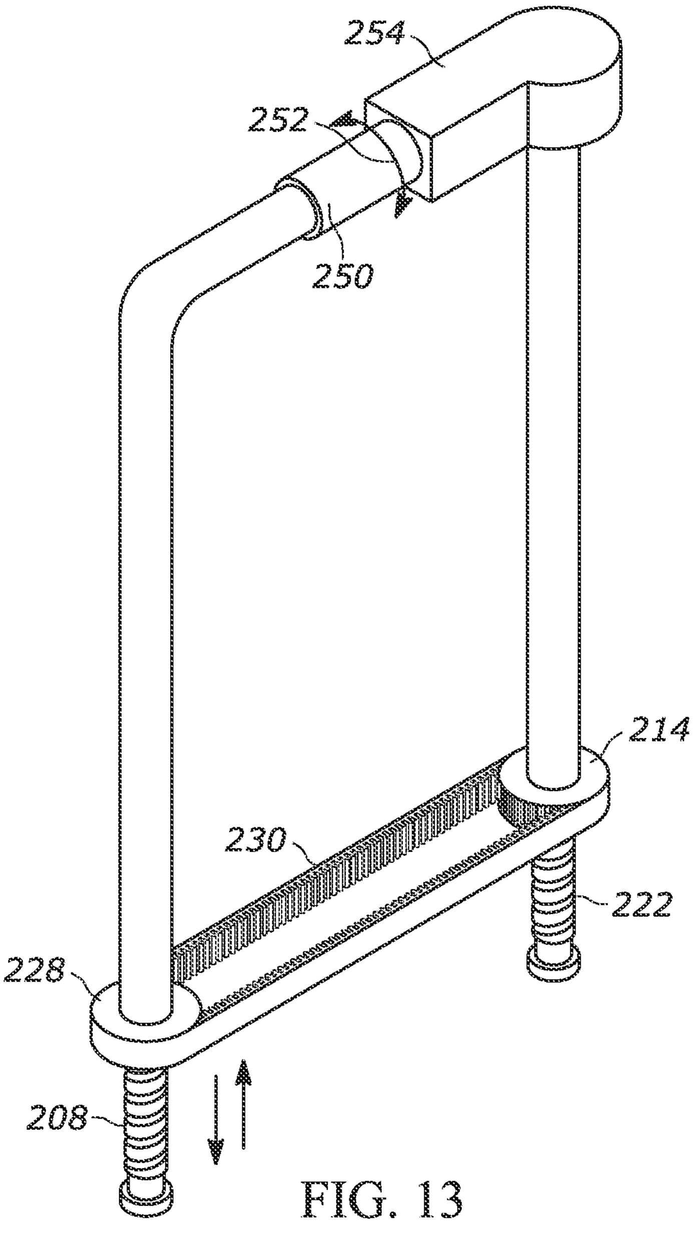
FIG. 13 depicts another example of a walker illustrating another mechanism for manually adjusting the legs up or down.

FIG. 13 depicts an example of one type of remote control that may be implemented either manually or motor driven. For example, a grip 250 may be disposed along a top portion of the U-shaped tube 206 and may be rotatable about an axis, which runs through the tube and through the grip, indicated by arrow 252. Such rotation may be transferred to the one or both ball nuts 214 and 228 through a corresponding linkage. The rotation of the grip 250 may be manual such as by rotating the grip around the U-shaped tube. In another example, a motor may be attached to the grip (e.g., within a housing 254) and be activated to rotate the ball nuts 214 and 228 in response to a switch, button or the like.

Figure 14A:
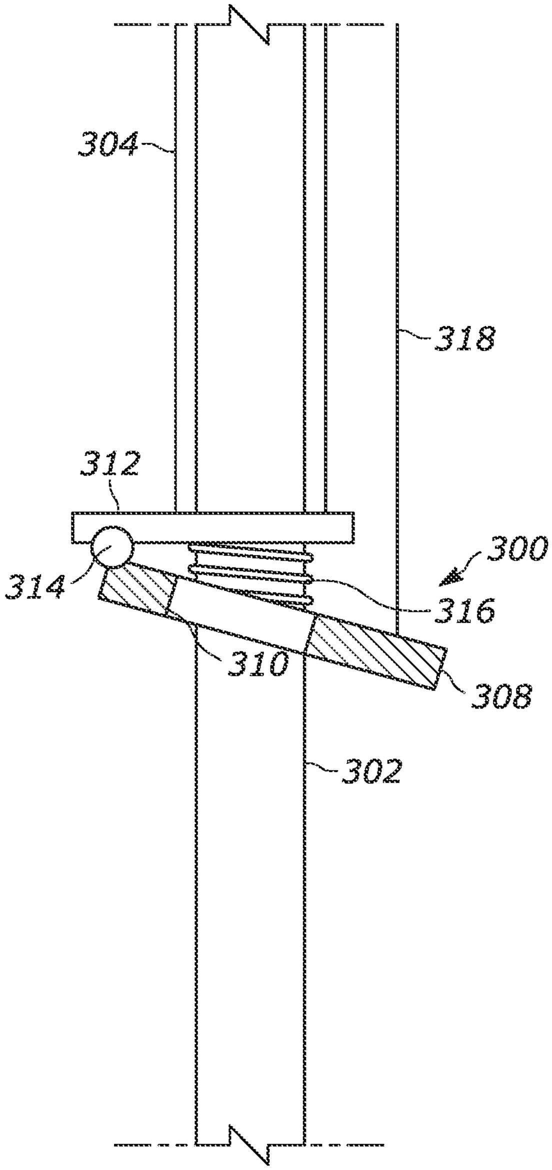
FIGS. 14A and 14B depict an example of a locking mechanism.
Figure 14B:
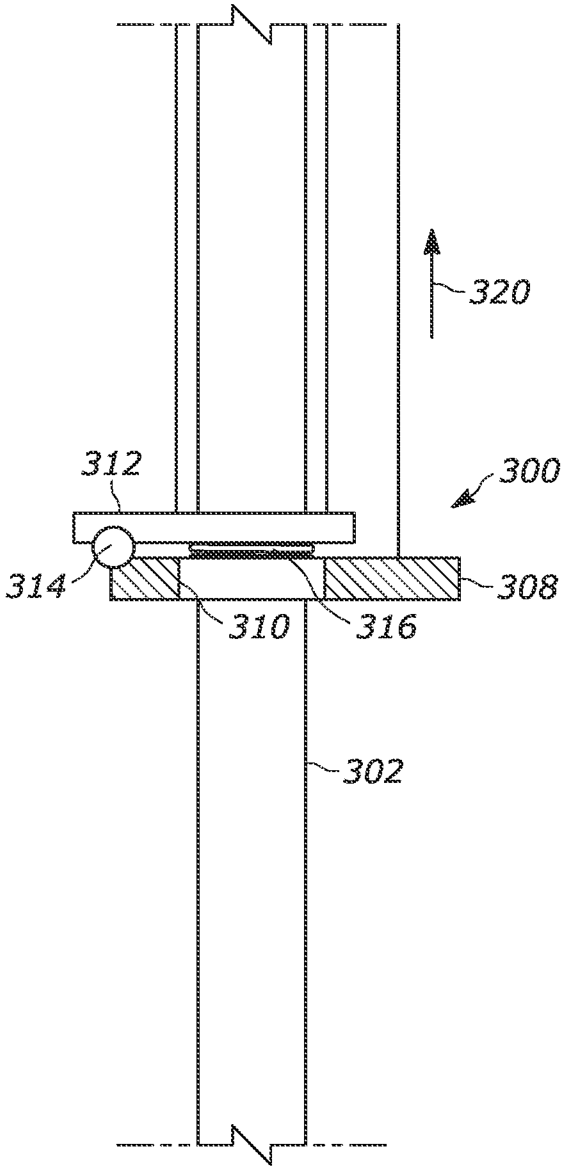

FIGS. 14A and 14B depict an example of a locking mechanism (e.g., clutch) 300 that may be utilized to selectively enable or disable telescoping movement of a strut with respect to a U-shaped tube relative to which the strut moves. For example, the locking mechanism 300 may be mounted within a cross brace, such as disclosed herein (e.g., 34 128, 220). In the example of FIGS. 14A and 14B, the locking mechanism 300 includes a plate 308 that includes an aperture 310 extending through the plate. The aperture 310 to receive a strut 302 (e.g., 24, 26, 112, 114, 202, 204). The aperture 310 may have an oval or oblong shape having a diameter that is slightly greater than the diameter of the strut 302. The plate 308 is connected to a support structure, schematically demonstrated at 312, through a rotatable connection 314, such as a pivot joint or other connection. The structure 312 may be part of or be fixed to the cross brace and/or be connected to an upper portion of a leg 304 relative to which the strut 302 moves telescopically.

A spring 316 may be interposed between the support structure 312 and a proximal surface of the plate 308. The spring 316 thus urges the plate away from the support 312, such that the plate engages and locks the strut 302 with respect to the upper portion of the leg 304 to inhibit the telescoping movement of the strut. Thus, when in the locked condition of FIG. 14A, axial forces between engagement of an inner edge of the aperture 310 and the outer surface of the strut 302 inhibit its axial movement. A cord or other connecting element 318 may be connected to a free end of the plate 308 creating a moment arm with the joint 314 to enable the plate 308 to rotate with respect to the joint 314 in response to applying force in the direction of the arrow 320 in FIG. 14B. In response to the force 320 exceeding the applied force of the spring 316, the plate 308 may be moved toward a more parallel position relative to the support 312, as shown in FIG. 14B, such that the aperture aligns more co-axially with the strut 302. When the aperture 310 is aligned coaxially with the strut 302, it enables substantially free axial movement of the strut with respect to the edges of the aperture. In response to allowing the force of the spring to exceed the force applied to the connecting element 318, the locking mechanism will return to its default condition and thereby lock the strut with respect to the upper leg portion 304, as shown in FIG. 14A.

Figure 15:
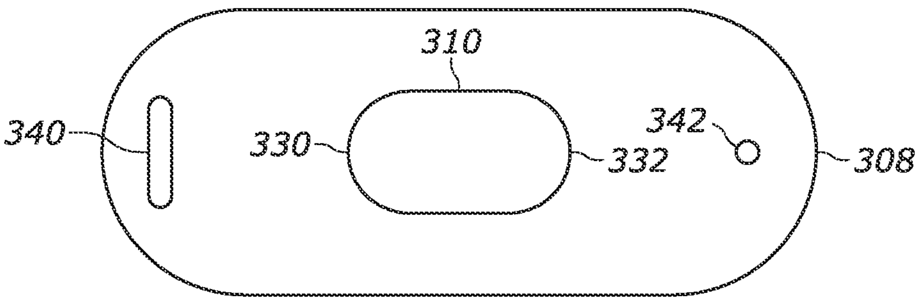
FIG. 15 depicts an example of a plate that can be used to provide part of the locking mechanism of FIGS. 14A and 14B.

FIG. 15 is a top view of an example of the plate 308 that may be used in the locking mechanism 300 of FIGS. 14A and 14B. The plate 300 includes inner aperture 310 demonstrated as having circular ends 330 and 332 spaced apart by generally parallel side walls. The radius of the ends 330 and 332 may substantially match that of an outer surface of the strut to increase the amount of surface area that engages the strut when in the locked condition (e.g., FIG. 14A). Another aperture 340 may be applied to facilitate joining to a joint structure about which the plate 308 may rotate. Another aperture 342 may be provided at the opposite end for connecting to the connecting element 318 that is used for activating the locking mechanism 300 to the position, which is shown in FIG. 14B, for enabling axial movement of the strut 302 through the aperture 310.

In view of the foregoing, various examples of self-leveling walkers have been described and may be used by a wide range of users. For example, the initial height of the walker can first be customized for the individual user by manipulating telescopic extensions as in existing walkers, then the relative lengths of each leg can be adjusted for uneven surfaces and stairs through the use of tubes within the legs of the walker, as disclosed herein. The walker disclosed herein thus may be used in a method that includes rotating a rotating element relative to at least one of a front leg or the rear leg of a walker to interface with a track on a respective strut. The respective strut extends outwardly from the leg relative to which the rotating element is being rotated. The method also includes translating the rotation of the rotating element to corresponding linear movement of the respective strut to adjust a length of the leg from which the respective strut extends. In this way, the walker thus can adjust the length of its legs and maintain its new configuration as the user negotiates the slanted or uneven surface, so that the user can more easily negotiate up or down ramps or ascending or descending steps in a stable upright vertical posture, thereby eliminating the problems inherent in a conventional walker which severely obstructs usage on sloped surfaces, especially during the climbing of stairs because of the fixed leg height which makes the walker unstable on steps and the like. Additionally, the walker may be configured to include any one or more of the following features:

a. support a weight of 75 lbs. or more;
b. allow continuous adjustability of each leg;
c. allow for up to about 8 inches (or more) of front-to-back leveling adjustability;
d. allow for folding of the walker;
e. enable locking in a default state, such as a last specified state;
f. allow wheels or glides to be added (e.g., to ends of the front legs) to provide for movement in a straight line;
g. both sides may be adjusted concurrently or separately;
h. may include a level indication (visible and/or audible indication);
i. height adjustment may be implemented while the walker is under load; and/or
j. allow one-handed operation to perform unlock adjustability.

Where the disclosure or claims recite "a," "an," "a first," or "another" element, or the equivalent thereof, it should be interpreted to include one or more than one such element, neither requiring nor excluding two or more such elements. As used herein, phrases and/or drawing labels such as "X-Y", "between X and Y" and "between about X and Y" can be interpreted to include X and Y.

It will be understood that when an element is referred to as being "on," "attached" to, "connected" to, "coupled" with, "contacting", "adjacent", etc., another element, it can be directly on, attached to, connected to, coupled with, contacting, or adjacent the other element or intervening elements may also be present.

Spatially relative terms, such as "under," "front," "rear," "below," "lower," "over," "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

While aspects of this disclosure have been particularly shown and described with reference to the example aspects above, it will be understood by those of ordinary skill in the art that various additional aspects may be contemplated. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials; however, the chosen material(s) should be biocompatible for many applications. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A walker comprising:

a first leg pair;

a second leg pair;

a cross beam connecting the first and second leg pairs in a parallel, spaced apart relationship, wherein each leg pair comprises:

a front leg;

a rear leg;

a front strut extending from the front leg and adapted to move axially relative to the front leg;

a rear strut extending from the rear leg and adapted to move relative to the rear leg; and a mechanical linear actuator including a rotating element adapted to rotate relative to at least one of the front leg or the rear leg of the respective leg pair, wherein the rotating element is adapted to interact with a respective strut so the respective strut moves axially responsive to rotation of the rotating element and the rotating element rotates responsive to axial movement of the respective strut; and a drive mechanism coupled to the rotating element and adapted to drive the rotation of the rotating element.

2. The walker of claim 1, wherein, for each leg pair:

the respective strut includes a track, and the rotating element of the respective leg pair includes an interface adapted to interact with the track on the respective strut.

3. The walker of claim 1, wherein, for each leg pair:

the front strut includes a front rack gear, the rotating element constitutes a front rotating gear having teeth that provide a pinion to interface with the front rack gear during movement of the front strut, the rear strut includes a rear rack gear, and the walker further comprises a rear rotating gear having teeth that provide a pinion to interface with the rear rack gear during movement of the rear strut.

4. The walker of claim 3, further comprising a cross brace extending between the front and rear legs of each leg pair, in which each cross brace includes the front rotating gear and the rear rotating gear of the respective leg pair mounted in a spaced apart relationship to enable rotation thereof relative to the respective cross brace.

5. The walker of claim 3, wherein the front rack gear extends along an inner edge of the front strut and the rear rack gear extends along an inner edge of the rear strut that faces the inner edge of the front strut.

6. The walker of claim 3, wherein the front and rear gears of a given leg pair are operatively coupled together so the front strut of the given leg pair moves in a given direction relative to the respective front leg responsive to moving the rear strut of the given leg pair in an opposite direction relative to the respective rear leg.

7. The walker of claim 6, wherein each leg pair further comprises:

a front sprocket attached to and coaxial with the front rotating gear of the respective leg pair;

a rear sprocket attached to and coaxial with the rear rotating gear of the respective leg pair;

a belt extending around the front and rear sprockets of the respective leg pair to provide the operative coupling between the front and rear rotating gears of the respective leg pair; and a locking mechanism having a first condition configured to enable rotation of at least one of the front and rear gears of the respective leg pair and a second condition configured to disable rotation of at least one of the front and rear gears of the respective leg pair.

8. The walker of claim 7, further comprising a control apparatus adapted to selectively operate the locking mechanism in one of the first or second conditions.

9. The walker of claim 1, wherein, for each leg pair:

a U-shaped tube defines the front leg and the rear leg of the respective leg pair, and a coupling extends within a passage of the U-shaped tube to couple the front and rear struts of the respective leg pair, such that one of the front or the rear strut moves in a given direction relative to its respective leg responsive to movement of the other of the front or the rear strut in an opposite direction relative to its respective leg.

10. The walker of claim 1, further comprising:

a locking mechanism having a first condition to disable the axial movement of at least one of the front and rear struts and a second condition to enable the axial movement of at least one of the front and rear struts; and a control apparatus adapted to selectively operate the locking mechanism in one of the first or second conditions.

11. The walker of claim 10, wherein the locking mechanism comprises:

a plate having an aperture extending through the plate to receive a portion of the front or rear strut;

a spring biased to urge the plate against an outer surface of the front or rear strut to provide the first condition of the locking mechanism.

12. The walker of claim 11, wherein the control apparatus comprises:

a lever mounted to one of the cross beam or one of the first or second leg pairs;

a connecting element between the lever and the plate, the connecting element adapted to transfer actuation of the lever to the plate to urge the plate against the spring to provide the second condition of the locking mechanism.

13. A walker comprising:

a first leg pair; and a second leg pair, wherein each leg pair comprises:

a front leg and a rear leg;

a front strut extending outwardly from and axially movable relative to the front leg;

a rear strut extending outwardly from and axially movable relative to the rear leg;

a front gear adapted to rotate relative to the front leg and interface with the front strut;

a rear gear adapted to rotate relative to the rear leg and interface with the rear strut; and a connecting element adapted to couple the front and rear gears of the respective leg pair together and drive movement of the front and rear struts in opposite axial directions and equal amounts relative to each other based on rotation of the front and rear gears.

14. The walker of claim 13, wherein each leg pair further comprises:

a front sprocket attached to and coaxial with the front gear of the respective leg pair; and a rear sprocket attached to and coaxial with the rear gear of the respective leg pair, in which the connecting element is around the front and rear sprockets of the respective leg pair to operatively couple the respective front and rear gears together.

15. The walker of claim 14, wherein the connecting element of a respective leg pair comprises a toothed belt having teeth along a surface thereof adapted to run over an outer surface of the front and rear sprockets of the respective leg pair.

16. The walker of claim 14, further comprising:

a locking mechanism having a first condition to disable axial movement of at least one of the front and rear struts and a second condition to enable the axial movement of at least one of the front and rear struts; and a control apparatus adapted to selectively operate the locking mechanism in one of the first or second conditions.

17. The walker of claim 16, wherein the connecting element of the respective leg pair comprises a belt extending around the front and rear sprockets of the respective leg pair to provide the operative coupling between the front and rear gears thereof, and wherein the locking mechanism comprises:

a locking member mounted for movement transverse to a surface of the belt; and an actuator adapted, responsive to the selective operation of the control apparatus, to move the locking member into engagement with the surface of the belt to place the locking mechanism in the first condition and to move the locking member out of engagement with the surface of the belt to place the locking mechanism in the second condition.

18. A walker comprising:

a first leg pair; and a second leg pair, wherein each leg pair comprises:

a front leg and a rear leg;

a front strut extending outwardly from and axially movable relative to the front leg;

a rear strut extending outwardly from and axially movable relative to the rear leg;

a front gear adapted to rotate relative to the front leg and interface with the front strut;

a rear gear adapted to rotate relative to the rear leg and interface with the rear strut; and a connecting element adapted to couple the front and rear gears of the respective leg pair together and facilitate movement of the front and rear struts in opposite axial directions relative to each other, wherein, for each leg pair:

a U-shaped tube defines the front leg and the rear leg of the respective leg pair, and an elongated coupling extends within a passage of the U-shaped tube to couple the front and rear struts of the respective leg pair, such that one of the front or the rear strut moves in a given direction relative to its respective leg responsive to movement of the other of the front or the rear strut in an opposite direction relative to its respective leg.

19. A walker comprising:

a first leg pair;

a second leg pair;

a cross beam connecting the first and second leg pairs in a parallel, spaced apart relationship, wherein each leg pair comprises:

a front leg and a rear leg coupled together;

a front strut extending outwardly from and axially movable relative to the front leg, the front strut including a front track;

a rear strut extending outwardly from and axially movable relative the rear leg, the rear strut including a rear track;

a front rotating element including an interface adapted to interact with the front track of the front strut of the respective leg pair, wherein the front strut moves in a respective axial direction and amount relative to the front leg depending on a direction and amount that the front rotating element rotates; and a rear rotating element including an interface adapted to interact with the rear track of the rear strut of the respective leg pair, wherein the rear strut moves in a respective axial direction and amount relative to the rear leg depending on a direction and amount that the rear rotating element rotates.

20. The walker of claim 19, wherein each leg pair further comprises a connecting element operatively coupled between the front and rear rotating elements of the respective leg pair to drive axial movement of the front and rear struts in opposite directions and proportional amounts relative to each other.

* * * * *